Sept. 20, 1932.   H. STREUBER   1,878,023
PROCESS FOR PRODUCING MECHANICAL NEGATIVES
Filed Feb. 12, 1929
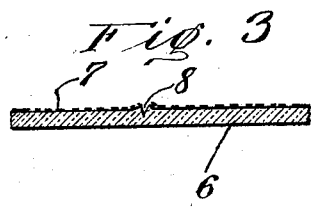
Inventor
Hans Streuber
By his Attorney
Aaron L. Applebaum Patented Sept. 20, 1932

1,878,023

UNITED STATES PATENT OFFICE

HANS STREUBER, OF BRONX, NEW YORK

PROCESS FOR PRODUCING MECHANICAL NEGATIVES

Application filed February 12, 1929. Serial No. 339,370.

My invention refers to the art of preparing diapositives showing line designs.

One of the objects of my invention is to simplify the procedure of preparing diapositives as used in the art of intaglio printing.

Another object of my invention is to produce such diapositives from photographic diapositives by super-imposing an etched design onto said photographic diapositives.

A further object of my invention is to produce diapositives which on one side show an etched design and on the other side a tinted background for said etched design.

These and other objects I obtain by the methods and improvements described in the following and the accompanying drawing serve to facilitate the understanding of my invention.

In the drawing:

Fig. 1 is a view showing an original and, on top thereof, partly sectioned away, a film as used in my invention.

Fig. 2 shows the glossy face of my film, after it has been finished.

Fig. 3 indicates a cross-section of the film during the process of preparing the same.

Similar numerals refer to similar parts throughout the various views.

For my invention I use a sheet of transparent material, celluloid, gelatine etc. To perform the method of my invention this transparent sheet must be provided with a smooth or glossy surface on one side and with a dull surface on the other side. One method of preparing a film of this kind is to take an ordinary, unexposed photographic film and subjecting the same to a fixing bath so it becomes transparent.

Another method for preparing the film of my invention consists in taking a transparent sheet of celluloid, gelatine or similar matter, which ordinarily is smooth on both sides, and in making one side thereof dull by roughening, grinding, chemical treatment or any of the many methods known to the art for producing such a dull surface on transparent sheets. For instance I may roughen one side of the film with an abrasive such as pumice stone in order that this surface will later on take the required shading or tinting necessary to bring out the details of the design.

Such a transparent film 6 is deposited with the dull face down and is suitably held in position on a photograph or picture 5, from which the diapositive of my invention is to be produced. The operator now cuts or scratches more or less deep grooves into the glossy surface of the film by means of a sharp pointed instrument such as a stylus or an etching needle. He cuts into said glossy surface the outlines and heavy shadings of the design to be produced. Then the glossy surface of the film with the cuts or etchings contained therein is treated with pulverized graphite or with any opaque material, which enters upon and is retained in the grooves cut into the glossy surface of the film. The surplus of the opaque material is wiped off and removed from the glossy surface, so that now the cut lines, full or partly full with the opaque material, clearly show in the transparent surface of the film.

In Figure 3 I show a cross-section of the cut film. 7 and 8 show smaller and larger grooves which have been cut into the surface of the film. The dull side of the film 6 faces down. After the glossy side of the film has been treated in this manner, it is deposited on a suitable table, preferably on a retouching table, with the glossy, cut surface down so that the operator is now at liberty to work on the dull surface of the film. Upon the dull surface of the film the operator now provides more or less dark or opaque portions of shading, which represent the background for the design provided on the glossy side of the film. Any tinting method may be used for providing a suitable background for the cut outlines on the dull surface of the film.

The diapositives are now ready for intaglio reproduction or for any other use to which a diapositive with an artistic design may be put.

While I have shown and described my invention with some degree of particularity, it will be realized that other modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. A diapositive, comprising a transparent film, a glossy and a dull surface on said film, grooves cut into said glossy surface, an opaque material in said grooves cut into said glossy surface, and portions of various degrees of translucency on said dull surface, serving as a background for said material in said grooves.

2. The method of preparing a diapositive on a transparent film which is glossy on one side and dull on the other side, comprising cutting a design into the glossy side of said film, filling an opaque material into the lines of said design, and tinting said dull side in various degrees of opacity to produce a background for the cut design on the glossy side of said film.

In testimony whereof I affix my signature.

HANS STREUBER.